United States Patent
Moon et al.

(10) Patent No.: US 10,418,646 B2
(45) Date of Patent: Sep. 17, 2019

(54) COMPOSITE MEMBRANE CONTAINING ION TRANSFER POLYMER AND METHOD FOR PREPARING SAME

(71) Applicant: LG CHEM, LTD., Seoul (KR)

(72) Inventors: Sikwon Moon, Daejeon (KR); Tae Geun Noh, Daejeon (KR); Bong Hyun Jeong, Daejeon (KR); Geungi Min, Daejeon (KR); Jeongbae Lee, Daejeon (KR); Sujin Byun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 142 days.

(21) Appl. No.: 15/509,547

(22) PCT Filed: Sep. 23, 2015

(86) PCT No.: PCT/KR2015/010028
§ 371 (c)(1),
(2) Date: Mar. 8, 2017

(87) PCT Pub. No.: WO2016/048041
PCT Pub. Date: Mar. 31, 2016

(65) Prior Publication Data
US 2017/0309927 A1 Oct. 26, 2017

(30) Foreign Application Priority Data
Sep. 23, 2014 (KR) .................. 10-2014-0127095

(51) Int. Cl.
*H01M 8/0245* (2016.01)
*H01M 8/1051* (2016.01)
*H01M 8/1053* (2016.01)
*H01M 8/18* (2006.01)
*H01M 8/1018* (2016.01)

(52) U.S. Cl.
CPC ....... *H01M 8/0245* (2013.01); *H01M 8/1051* (2013.01); *H01M 8/1053* (2013.01); *H01M 8/188* (2013.01); *H01M 2008/1095* (2013.01); *H01M 2300/0082* (2013.01); *H01M 2300/0094* (2013.01); *Y02E 60/528* (2013.01); *Y02P 70/56* (2015.11)

(58) Field of Classification Search
CPC ............. H01M 8/0245; H01M 8/1051; H01M 8/1053; H01M 8/188; H01M 2008/1095; H01M 2300/0082; H01M 2300/0094; Y02P 70/56; Y02E 60/528
See application file for complete search history.

(56) References Cited

U.S. PATENT DOCUMENTS

| | | | |
|---|---|---|---|
| 8,574,716 B2 * | 11/2013 | Wu | C08J 5/2256 427/58 |
| 2006/0068268 A1 | 3/2006 | Olmeijer | |
| 2006/0292415 A1 | 12/2006 | Song et al. | |
| 2009/0176141 A1 | 7/2009 | Santurri et al. | |
| 2011/0014544 A1 | 1/2011 | Lee et al. | |
| 2011/0070522 A1 | 3/2011 | Yamauchi et al. | |
| 2011/0200907 A1 | 8/2011 | Moon et al. | |
| 2012/0202099 A1 | 8/2012 | Perry et al. | |
| 2013/0236808 A1 * | 9/2013 | Sugiura | H01M 8/1004 429/480 |

FOREIGN PATENT DOCUMENTS

| | | |
|---|---|---|
| JP | 2009-26535 A | 2/2009 |
| JP | 2010-27606 A | 2/2010 |
| KR | 10-2007-0001011 A | 1/2007 |
| KR | 10-0701473 B1 | 3/2007 |
| KR | 10-0786841 B1 | 12/2007 |
| KR | 10-2009-0054875 A | 6/2009 |
| KR | 10-2009-0123818 A | 12/2009 |
| KR | 10-2010-0084237 A | 7/2010 |
| WO | WO 2007/126222 A1 | 11/2007 |

OTHER PUBLICATIONS

Kim, J., et al, "Delamination of microporous layered silicate by acid-hydrothermal treatment and its use for reduction of methanol crossover in DMFC," Microporous and Mesoporous Materials, 2013, vol. 168, pp. 148-154.
Kim, J., et al, "Nafion-based composite membrane with a permselective layered silicate layer for vanadium redox flow battery," Electrochemistry Communications, 2014, vol. 38, pp. 68-70.
International Search Report for PCT/KR2015/010028 dated Nov. 20, 2015.
Extended European Search Report dated Jan. 18, 2018 in European Patent Application 15844211.1.
European Office Action dated May 29, 2019 for Application No. 15844211.1.
Plantz, Philip E. "Correlation Among Particle Size Methods", Application Note SL-AN-12 Revision B, Particle Size Measuring Instrumentation, pp. 1-8.

* cited by examiner

*Primary Examiner* — Anca Eoff
(74) *Attorney, Agent, or Firm* — Birch, Stewart, Kolasch & Birch, LLP

(57) ABSTRACT

The present specification relates to a composite membrane containing an ion transfer polymer and a method for preparing the same.

15 Claims, 6 Drawing Sheets

[Figure 1]
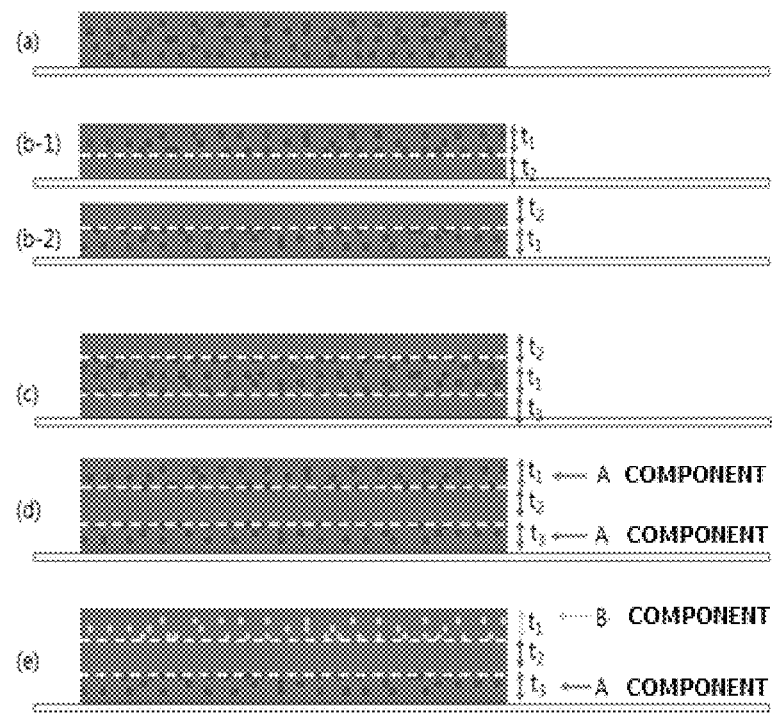

[Figure 2]
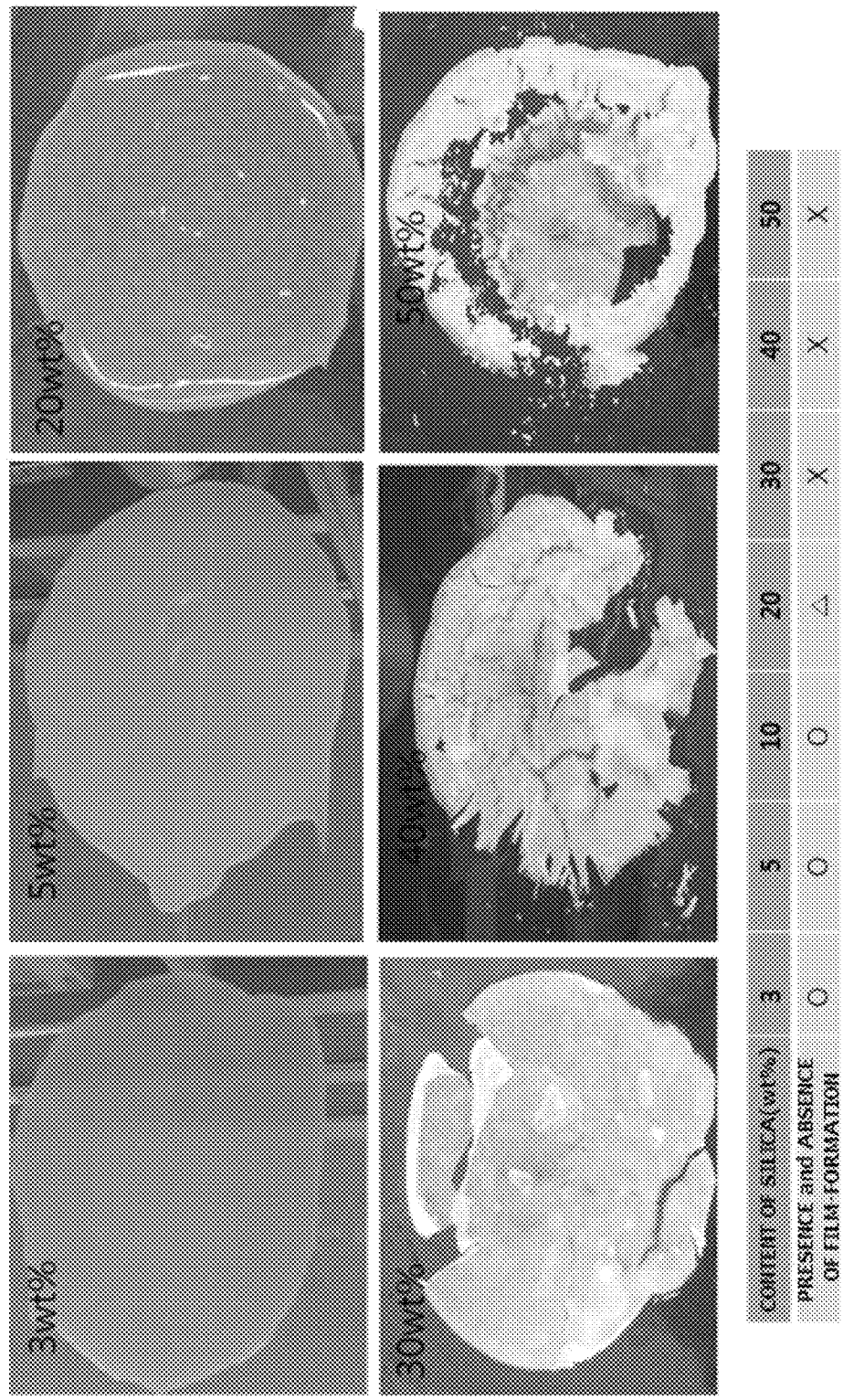

[Figure 3]
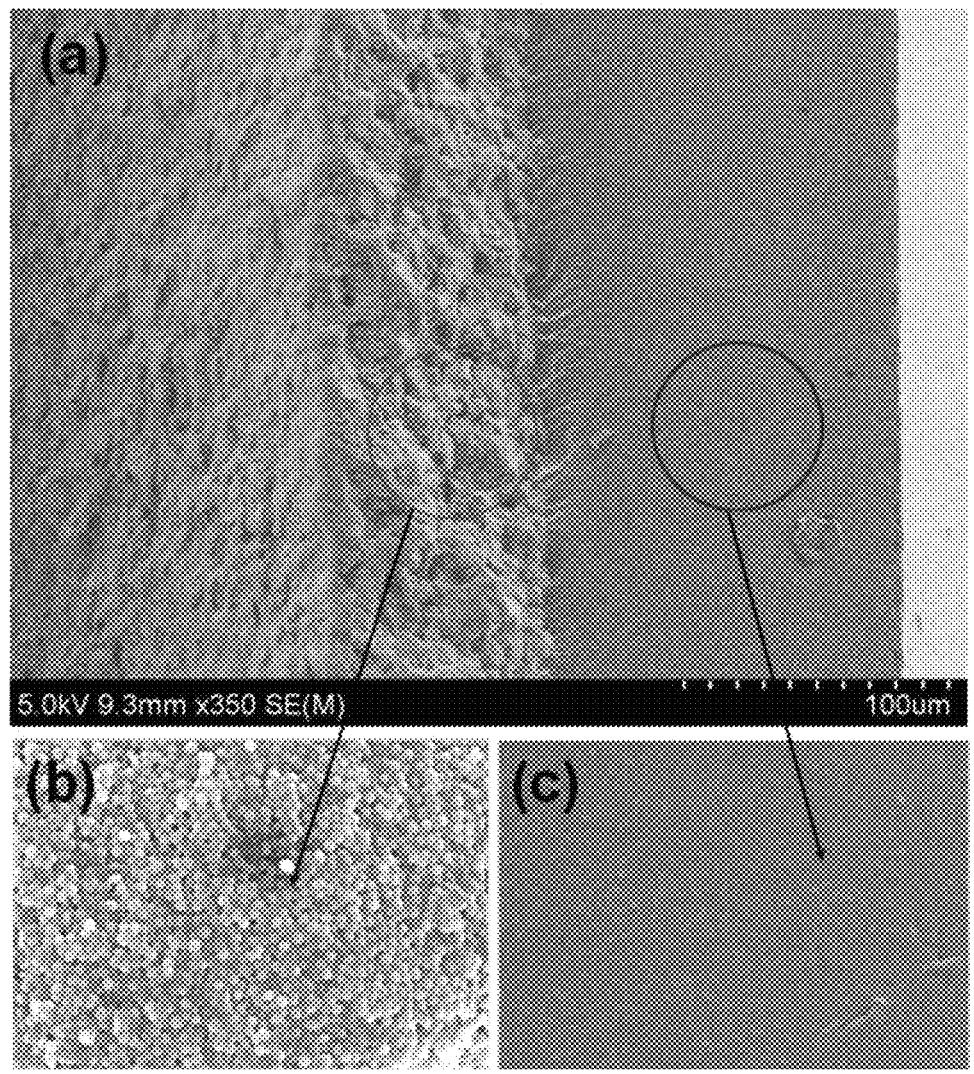

[Figure 4]
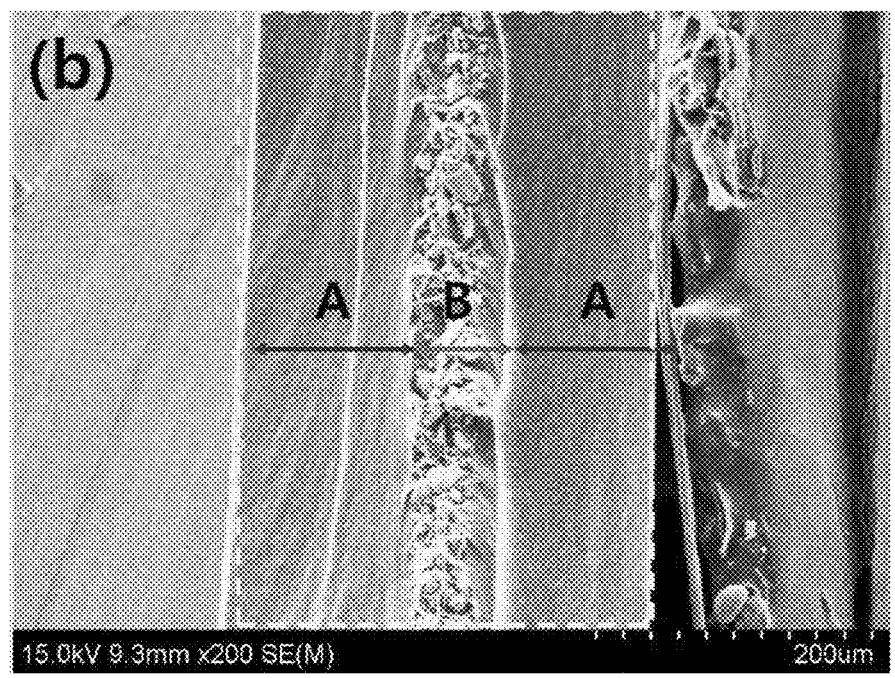

[Figure 5]
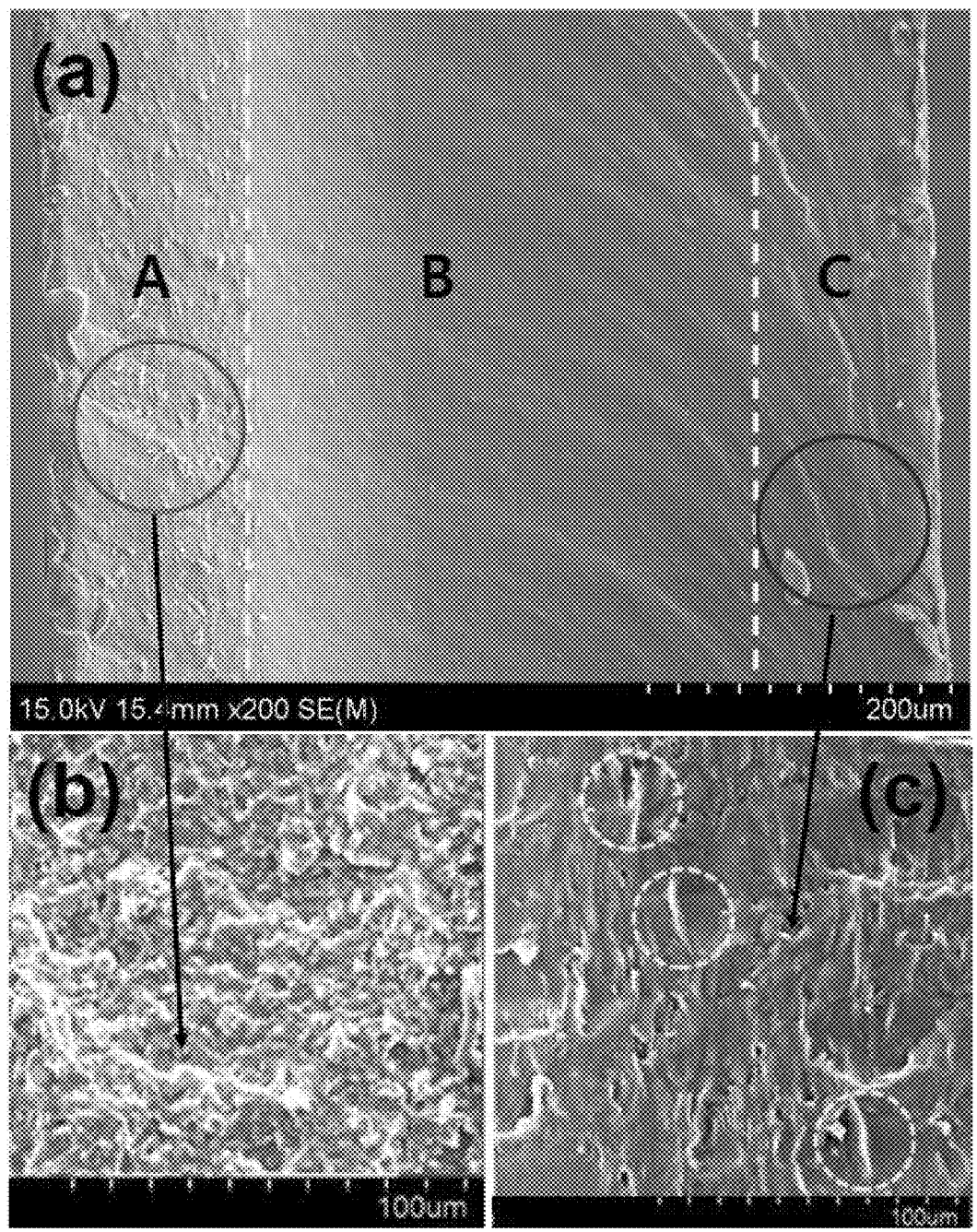

[Figure 6]
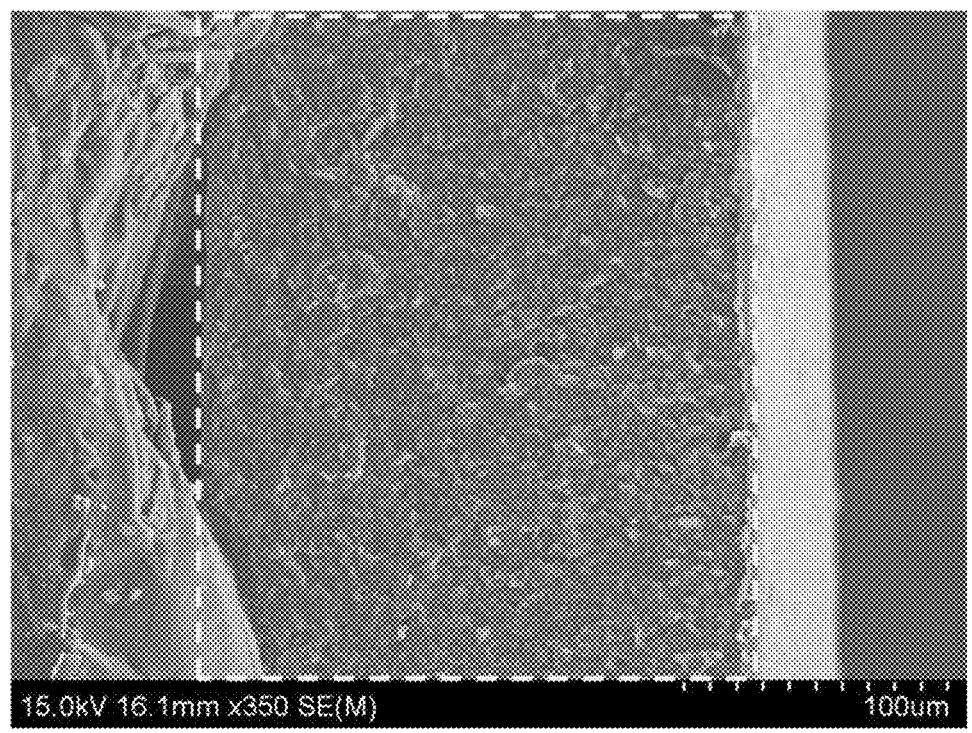

COMPOSITE MEMBRANE CONTAINING ION TRANSFER POLYMER AND METHOD FOR PREPARING SAME

TECHNICAL FIELD

The present invention claims priority to and the benefit of Korean Patent Application No. 10-2014-0127095 filed in the Korean Intellectual Property Office on Sep. 23, 2014, the entire contents of which are incorporated herein by reference.

The present specification relates to a composite membrane containing an ion transfer polymer and a method for preparing the same.

BACKGROUND ART

A fuel cell is a static energy conversion device in which fuel and oxygen supplied from the outside are electrochemically reacted by a catalytic action and electric energy and heat energy are obtained directly and simultaneously from the fuel. An ion permeable layer called an electrolyte is present between an air electrode (positive electrode) and a fuel electrode (negative electrode) of the fuel cell, and the fuel cell is classified into five types of a phosphoric acid fuel cell (PAFC), a polymer electrolyte membrane (PEM), a molten carbonate fuel cell (MCFC), a solid oxide fuel cell (SOFC), and an alkaline fuel cell (AFC), according to the type of electrolyte.

The fuel cell has an advantage in that the fuel cell has a higher efficiency and thus uses less amount of fuel than existing internal combustion engines, and is a pollution-free energy source which does not generate environmental pollutants such as $SO_x$, $NO_x$, and VOC. Further, the fuel cell has an additional advantage in that a location area required for production facilities is small, a construction period is short, and the like.

Therefore, the fuel cell has various application fields from a mobile power source such as a mobile device and a power source for transportation, such as vehicles, to distributed power generation which can be used for home use and electric power business use. In particular, when the operation of fuel cell vehicles, which are a next-generation transportation device, is put into practical use, a potential market size for the fuel cell is expected to be extensive.

A redox flow battery is one of the rechargeable fuel cells. The redox flow battery has an electrolyte including various kinds of electrically active materials therein, and is a secondary battery in which the charge/discharge occurs due to the oxidation and reduction reactions of the electrolyte. The biggest difference from general batteries is that the charge/discharge occurs while circulating the electrolyte where energy is stored. Specifically, unlike other batteries, an active material of the redox flow battery exists as ions in an aqueous solution state instead of a solid state, and the redox flow battery has a mechanism of storing and generating electric energy according to the oxidation/reduction reaction of each ion in a positive electrode and a negative electrode. That is, the redox flow battery is in an electrolyte liquid (solution) state in which an active material of an electrode is dissolved in a solvent, and when a battery including a catholyte and an anolyte having different oxidation numbers is charged, an oxidation reaction and a reduction reaction occur at the positive electrode and the negative electrode, respectively, and the electromotive force of the battery is determined by a difference between standard electrode potentials (E0) of a redox couple forming the catholyte and the anolyte. Examples of the redox couple include Fe/Cr, V/Br, Zn/Br, Zn/Ce, V/V, and the like but vanadium (V/V) redox couples have been frequently used in consideration of an amount of storable electricity or economic efficiency, and the like. Meanwhile, the electrolyte liquid is supplied from an, electrolyte liquid tank by a pump, and the redox flow battery has both an advantage of a general battery in which the reaction rates of oxidation and reduction are fast on the surfaces of the positive electrode and the negative electrode and an advantage of a fuel cell having high output characteristics.

In order to prepare a separation membrane that permeates only hydrogen, ion exchange resins are used, and when a separation membrane is prepared by using only a polymer resin, the selective permeability of hydrogen ions is low, and the physical strength of the separation membrane is also weak. In order to overcome the aforementioned limitations of the polymer resin, additives are mixed and used to increase the ion conductivity and selective permeability of hydrogen.

However, in the technology of preparing a composite membrane in the related art, an additive is mixed with an ion exchange resin solution, and a film is formed in a form of a single layer by using one solution. The method as described above has a limitation in the amount of inorganic materials added. Further, the method has a disadvantage in that the membrane is split due to additives, which are not dispersed well, because it is difficult to uniformly disperse materials.

DETAILED DESCRIPTION OF THE INVENTION

Technical Problem

The present specification has been made in an effort to provide a composite membrane containing an ion transfer polymer and a method for preparing the same.

Technical Solution

An exemplary embodiment of the present specification provides a composite membrane including two or more polymer layers including an ion transfer polymer, in which the polymer layer includes: a first polymer layer composed of an ion transfer polymer or composed of an ion transfer polymer and a stabilizer; and a second polymer layer provided on the first polymer layer and having an ion transfer polymer and a functional additive particle, and the functional additive particle is at least one of a silicon element-containing particle, a graphite oxide particle, a metal particle, and a metal oxide particle.

Another exemplary embodiment of the present specification provides an electrochemical cell including: a negative electrode; a positive electrode; and the above-described composite membrane disposed between the negative electrode and the positive electrode.

Still another exemplary embodiment of the present specification provides a method for preparing a composite membrane including two or more polymer layers including an ion transfer polymer, in which the polymer layer includes: a first polymer layer composed of an ion transfer polymer or composed of an ion transfer polymer and a stabilizer; and a second polymer layer provided on the first polymer layer and having an ion transfer polymer and a functional additive particle, and the functional additive particle is at least one of a silicon element-containing particle, a graphite oxide particle, a metal particle, and a metal oxide particle.

Advantageous Effects

According to exemplary embodiments described in the present specification, it is possible to obtain a composite membrane having a desired form according to the position of a polymer layer including an ion transfer polymer and a polymer layer including a functional additive particle and an ion transfer polymer without including a functional additive particle according the form of the membrane.

Further, according to the above-described exemplary embodiments, it is possible to prevent a composite membrane from being split, to maximize an amount of the functional additive particle because a desired amount of a functional additive particle may be locally put into a desired position, and to maximize the function of the additive even when an equal amount of functional additive particle is used.

BRIEF DESCRIPTION OF DRAWINGS

FIG. 1 is a view exemplifying the structures of composite membranes according to the related art and some exemplary embodiments of the present specification.

FIG. 2 is an image after film-forming a single membrane prepared by increasing the content of silica.

FIG. 3 is a cross-sectional SEM image of a composite membrane in Example 1.

FIG. 4 is a cross-sectional SEM image of a composite membrane in Example 2.

FIG. 5 is a cross-sectional SEM image of a composite membrane in Example 3.

FIG. 6 is a cross-sectional SEM image of a composite membrane in Comparative Example 3.

BEST MODE

Hereinafter, the present specification will be described in more detail.

An exemplary embodiment of the present specification provides a composite membrane including two or more polymer layers including an ion transfer polymer, in which two or more of the polymer layers include functional additive particles having different contents; or at least one layer of the polymer layers includes a functional additive particle, and at least one layer of the polymer layers does not include a functional additive particle.

FIG. 2 is an image after film-forming a single membrane prepared by increasing the content of silica. Specifically, as a result of forming a film by adjusting the content of a silica particle to 3 wt %, 5 wt %, 20 wt %, 30 wt %, 40 wt %, and 50 wt %, respectively, based on the sum of the weights of an ion transfer polymer and a silica particle, it can be seen that a membrane including 30 wt % or more of a silica particle is broken without being film-formed. Therefore, when the content of the silica particle in the membrane is large, it can be seen that a film is not formed, and as a result, the membrane may not be prepared into an electrolyte membrane.

An exemplary embodiment of the present specification provides a composite membrane including two or more polymer layers including an ion transfer polymer, in which the polymer layer includes: a first polymer layer composed of an ion transfer polymer or composed of an ion transfer polymer and a stabilizer; and a second polymer layer provided on the first polymer layer and having an ion transfer polymer and a functional additive particle, and the functional additive particle is at least one of a silicon element-containing particle, a graphite oxide particle, a metal particle, and a metal oxide particle.

Based on the total weight of the polymer layer including the functional additive particle, the content of the functional additive particle may be 30 wt % or more and 80 wt % or less. A polymer layer which does not include a functional additive particle is together provided, so that there is an advantage in that a film can be formed even though the content of the functional additive particle in a polymer layer including the functional additive particle is high. Specifically, based on the total weight of the second polymer layer, the content of the functional additive particle may be 30 wt % or more and 80 wt % or less.

The polymer layer including the functional additive particle may have a thickness of 60 μm or more and 150 μm or less. A polymer layer which does not include a functional additive particle is together provided, so that there is an advantage in that a film can be formed even though the polymer layer including the functional additive particle is a thick film having a large thickness. Specifically, the second polymer layer may have a thickness of 60 μm or more and 150 μm or less.

As illustrated in (a) of FIG. 1, unlike the related art in which the functional additive particle is distributed in the entire composite membrane, the composite membrane according to an exemplary embodiment of the present specification includes both at least one polymer layer including the functional additive particle and at least one polymer layer which does not include the functional additive particle.

At least one surface of the polymer layer including the functional additive particle may be brought into contact with the polymer layer which does not include the functional additive particle.

The first polymer layer may be brought into contact with one surface of the second polymer layer.

According to another exemplary embodiment of the present specification, the polymer layer which does not include the functional additive particle may be provided while being brought into contact with the lower portion of the polymer layer including the functional additive particle. The structure of the composite membrane as described above is exemplified in (b-1) of FIG. 1.

According to an exemplary embodiment of the present specification, the polymer layer which does not include the functional additive particle may be provided while being brought into contact with the upper portion of the polymer layer including the functional additive particle. The structure of the composite membrane as described above is exemplified in (b-2) of FIG. 1.

The composite membrane may include two or more layers having different densities.

As an example, the composite membrane may be prepared by first forming a layer having a higher density of the polymer layer including the functional additive particle and the polymer layer which does not include the functional additive particle, and then forming a layer having a lower density.

As another example, the composite membrane may be prepared by simultaneously forming the polymer layer including the functional additive particle and the polymer layer which does not include the functional additive particle to form the layer having a higher density under the layer having a smaller density.

The composite may include one or more layers of the polymer layer which does not include the functional additive particle and is provided on each of the upper portion and the lower portion of the polymer layer including the functional additive particle.

The composite membrane may further include a fourth polymer layer provided on a surface opposite to a surface of the second polymer layer on which the first polymer layer is provided, wherein the fourth polymer layer composes of an ion transfer polymer, or composes of an ion transfer polymer and a stabilizer. Specifically, the second polymer layer and the fourth polymer layer may be provided while being brought into contact with each other, and the second polymer layer and the first polymer layer may be provided while being brought into contact with each other.

When a polymer layer which does not include the functional additive particle is provided on the upper portion and the lower portion of the polymer layer including the functional additive particle, the polymer layer including the functional additive particle is not exposed to an electrolyte liquid, and as a result, there is an advantage in that the durability is improved because the functional additive particle is prevented from deteriorating or being fallen off.

The second polymer layer may be provided inside of the composite membrane in a thickness direction of the composite membrane. Specifically, the second polymer layer may be positioned within a range of 10% or more and 90% or less of the thickness of the composite membrane from the upper surface or the lower surface of the composite membrane. More specifically, the second polymer layer may be positioned within a range of 30% or more and 70% or less of the thickness of the composite membrane from the upper surface or the lower surface of the composite membrane.

As illustrated in (c) of FIG. 1, the composite may include the polymer layer which does not include the functional additive particle and is provided on each of the upper portion and the lower portion of the polymer layer including the functional additive particle.

The composite may include one or more polymer layers including the functional additive particle and provided on each of the upper portion and the rower portion of the polymer layer which does not include the functional additive particle.

According to another exemplary embodiment of the present specification, at least one layer of the polymer layers including the functional additive particle may include two or more functional additive particles which are different from each other.

The composite membrane may further include a third polymer layer provided on a surface opposite to a surface of the first polymer layer on which the second polymer layer is provided, wherein the third polymer layer has an ion transfer polymer and a functional additive particle. Specifically, the first polymer layer and the second polymer layer may be provided while being brought into contact with each other, and the first polymer layer and the third polymer layer may be provided while being brought into contact with each other.

The functional additive particle of the second polymer layer and the functional additive particle of the third polymer layer may be the same as or different from each other.

As illustrated in (d) and (e) of FIG. 1, the composite may include the polymer layer including the functional additive particle and provided on each of the upper portion and the lower portion of the polymer layer which does not include the functional additive particle. Specifically, (d) of FIG. 1 illustrates a case where the polymer layer including the functional additive particle and provided on each of the upper portion and the lower portion of the polymer layer which does not include the functional additive particle includes functional additive particles having the same component, and (e) of FIG. 1 illustrates a case where the polymer layer including the functional additive particle and provided on each of the upper portion and the lower portion of the polymer layer which does not include the functional additive particle includes functional additive particles having different components.

The functional additive particle may include one or more selected from a material capable of preventing water or an electrolyte liquid such as a vanadium solution from being permeated and a material capable of increasing the conductivity, but is not limited thereto.

The functional additive particle may be selected from the group consisting of inorganic materials or organic materials. The inorganic material may be selected from the group consisting of metals, metal oxides, non-metals, and non-metal oxides, but is not limited thereto. For example, the functional additive particle may include at least one of a silicon element-containing particle, a graphite oxide particle, a metal particle, and a metal oxide particle.

The silicon element-containing particle is not particularly limited as long as the silicon element-containing particle includes a silicon element, but the silicon element-containing particle may be a silicon (Si) particle, a silica particle or a silica particle having a sulfonic acid group, and the like.

The metal particle or the metal oxide particle may include at least one of Ag, Ni, Cu, Ti, Pt, and oxides thereof.

According to another exemplary embodiment of the present specification, the functional additive particle may have a particle diameter of 1 nm or more and 100 μm or less.

According to still another exemplary embodiment of the present specification, the functional additive particle may have a particle diameter of a nano-size, for example, 1 nm or more and 1,000 nm or less.

According to yet another exemplary embodiment of the present specification, at least one layer of the polymer layers may include two or more ion transfer polymers which are different from each other.

According to still yet another exemplary embodiment of the present specification, the ion transfer polymers included in an adjacent polymer layer among the polymer layers may be the same as or different from each other.

According to a further exemplary embodiment of the present specification, the ion transfer polymer of the polymer layer including the functional additive particle may be the same as the ion transfer polymer of the polymer layer which does not include the functional additive particle.

Further, the ion transfer polymer of the polymer layer including the functional additive particle may be different from the ion transfer polymer of the polymer layer which does not include the functional additive particle.

According to another further exemplary embodiment of the present specification, the ion transfer polymers between the polymer layers including the functional additive particle may be the same as each other.

According to still another further exemplary embodiment of the present specification, the ion transfer polymers between the polymer layers including the functional additive particle may be different from each other.

Another exemplary embodiment of the present specification provides a method for preparing a composite membrane including an ion transfer polymer and a functional additive particle, in which the composite membrane has a portion where the concentration of the functional additive particle in a thickness direction of the composite membrane is different from those of the other portions.

According to an exemplary embodiment of the present specification, the composite membrane is a composite membrane including an ion transfer polymer and a functional additive particle, in which the functional additive particle may be included up to a position which is 80% of the total thickness from one surface of the composite membrane in a thickness direction of the composite membrane. For example, the functional additive particle may be included up to a position which is 50% of the total thickness from one surface of the composite membrane in a thickness direction of the composite membrane.

According to an exemplary embodiment of the present specification, the concentration of the functional additive particle may be gradually changed in a thickness direction of the composite membrane.

According to an exemplary embodiment of the present specification, the concentration of the functional additive particle may be gradually increased in an upper direction of the composite membrane.

According to an exemplary embodiment of the present specification, the concentration of the functional additive particle may be gradually increased in a lower direction of the composite membrane.

According to some exemplary embodiments of the present specification, the composite membrane may further include one or more polymer layers, which does not include the functional additive particle, at the upper portion or the lower portion of the composite membrane in which the concentration of the functional additive particle is gradually changed in a thickness direction of the composite membrane.

According to another embodiment of the present specification, the composite membrane may further include one or more polymer layers, which does not include the functional additive particle, at the upper portion and the lower portion of the composite membrane in which the concentration of the functional additive particle is gradually changed in a thickness direction of the composite membrane.

According to some other exemplary embodiments of the present specification, the composite membrane may further include one or more polymer layers including the functional additive particle at the upper portion or the lower portion of the composite membrane in which the concentration of the functional additive particle is gradually changed in a thickness direction of the composite membrane.

According to some other exemplary embodiments of the present specification, the composite membrane may further include one or more polymer layers including the functional additive particle at the upper portion and the lower portion of the composite membrane in which the concentration of the functional additive particle is gradually changed in a thickness direction of the composite membrane.

The number and sequence of laminating layers in the present specification may vary, the number of stacks of laminating a layer including a composite material may be one or more layers, and the number of layers may be unlimitedly numerous.

According to an exemplary embodiment of the present specification, the content of the functional additive particle included in the total composite membrane is 0.01 wt % to 99.9 wt % based on the total composite membrane. Further, among the polymer layers, the content of the functional additive particle in each polymer layer including the functional additive particle is 0.01 wt % to 99.9 wt % based on each polymer layer including the functional additive particle.

According to an exemplary embodiment of the present specification, when the content of a particle capable of preventing water or an electrolyte liquid, such as a vanadium solution from being permeated, such as a silica particle, MMT, and a graphene oxide particle, is large, hydrogen ions may be prevented from being permeated, and water or vanadium ions may also be prevented from being permeated.

According to another exemplary embodiment of the present specification, a particle capable of increasing conductivity, such as Ag, Ni, and Cu particles may increase hydrogen ion conductivity. When the particle capable of increasing conductivity is added in an appropriate content, it is possible to prevent the short-circuit of a cell from being caused. A polymer resin serves as a binder which captures the particles, and when the content of the polymer is appropriate, it is possible to prevent the transfer of hydrogen ions from being suppressed.

According to an exemplary embodiment of the present specification, the composite membrane may have a thickness of 0.1 μm or more and 1,000 μm or less.

According to an exemplary embodiment of the present specification, each polymer layer including the functional additive particle may have a thickness of 0.1 nm or more and 1,000 μm or less. According to an exemplary embodiment of the present specification, each polymer layer which does not include the functional additive particle may have a thickness of 0.1 nm or more and 1,000 μm or less.

According to an exemplary embodiment of the present specification, the thickness ratio between the polymer layers having different contents of the functional additive particle, or the thickness ratio between the polymer layer including the functional additive particle and the polymer layer which does not include the functional additive particle may be $1:10^6$ or more and $10^6:1$ or less.

For example, in (b-1, 2) of FIG. 1, the thickness ratio of the layers t1:t2 is from 1:0.1 to 1:10,000.

As another example, in (c) of FIG. 1, in the thickness ratio of the layers t1:t2:t3=a:b:c, a:b may be from 0.1:1 to 10,000:1, and b:c may be from 0.01:1 to 1:100.

As still another example, in (d) of FIG. 1, in the thickness ratio of the layers t1:t2:t3=d:e:f, d:e may be from 1:10,000 to 1:0.1, and d:f may be from 100:1 to 1:100.

In the present specification, the "thickness" may mean a distance between two facing main surfaces of a composite membrane or a polymer layer.

In general, when a functional particle in excess is introduced, the membrane may be split, or particles may be separated from the membrane, but when the membrane is prepared as several layers according to some exemplary embodiments of the present invention, the polymer layer captures the layer of the functional particle, and as a result, it is possible to significantly increase the content of the functional particle. Further, a layer locally containing a large amount of a functional particle may be prepared to maximize functionality and make the membrane uniform during the film-formation.

According to an exemplary embodiment of the present specification, the ion transfer polymer may be used without limitation as long as the polymer may conduct hydrogen ions.

Examples of the ion transfer polymer may include one or more selected from an ion exchange resin of a hydrocarbon; a fluorine-based ion resin; and an anionic resin, but are not limited thereto. For example, the fluorine-based ion resin may be Nafion (manufactured by DuPont).

Specifically, examples of the ion transfer polymer include a copolymer including a repeating unit of the following Chemical Formula A and a repeating unit of the following Chemical Formula B.

Examples of the ion transfer polymer include a copolymer including a repeating unit of the following Chemical Formula A and a repeating unit of the following Chemical Formula B.

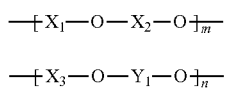

[Chemical Formula A]

[Chemical Formula B]

In Chemical Formulae A and B, $X_1$, $X_2$, and $X_3$ are the same as or different from each other, and are each independently represented by any one of the following Chemical Formulae 1 to 3,

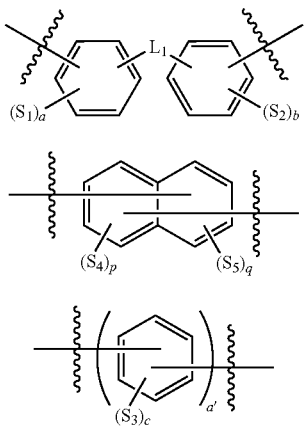

[Chemical Formula 1]

[Chemical Formula 2]

[Chemical Formula 3]

In Chemical Formulae 1 to 3, m and n mean the repeating unit number, and $1 \leq m \leq 500$ and $1 \leq n \leq 500$, $L_1$ is a direct link, or any one of —$CZ_2Z_3$—, —CO—, —O—, —S—, —$SO_2$—, —$SiZ_2Z_3$—, and a substituted or unsubstituted divalent fluorene group, $Z_2$ and $Z_3$ are the same as or different from each other, and are each independently any one of hydrogen, an alkyl group, a trifluoromethyl group (—$CF_3$), and a phenyl group, $S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group, a, b, and c are the same as or different from each other, and are each independently an integer of 0 or more and 4 or less, p and q are the same as or different from each other, and are each independently an integer of 0 or more and 4 or less, a' is an integer of 1 or more and 5 or less, and in Chemical Formula B, $Y_1$ is represented by any one of the following Chemical Formulae 4 to 6,

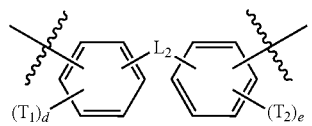

[Chemical Formula 4]

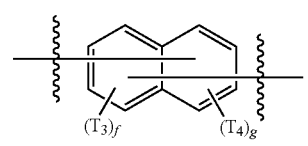

[Chemical Formula 5]

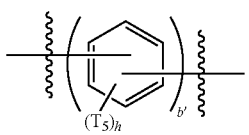

[Chemical Formula 6]

in Chemical Formulae 4 to 6, $L_2$ is a direct link, or any one selected from —CO—, —$SO_2$—, and a substituted or unsubstituted divalent fluorene group, d, e, and h are the same as or different from each other, and are each independently an integer of 0 or more and 4 or less, f and g are the same as or different from each other, and are each independently an integer of 0 or more and 3 or less, b' is an integer of 1 or more and 5 or less, and $T_1$ to $T_5$ are the same as or different from each other, and each independently, at least one thereof is —$SO_3H$, —$SO_3^-M^+$, —COOH, —$COO^-M^+$, —$PO_3H_2$, —$PO_3H^-M^+$, or —$PO_3^{2-}2M^+$, and M is an element of Group 1, and the others are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted aryl group; or a substituted or unsubstituted heteroaryl group.

In another exemplary embodiment of the present specification, the ion transfer polymer may include a copolymer further including a repeating unit represented by the following Chemical Formula C.

[Chemical Formula C]

In Chemical Formula C, Z is a trivalent organic group. In Chemical Formula C, Z is a trivalent organic group, and may be each bonded to additional repeating units in three directions to elongate a polymer chain.

Chemical Formula A means hydrophobicity, and Chemical Formula B means hydrophilicity. The "hydrophilicity" is a repeating unit including a hydrophilic ion transfer functional group —$SO_3H$, —$SO_3^-M^+$, —COOH, —$COO^-M^+$, —$PO_3H_2$, —$PO_3H^-M^+$, or —$PO_3^{2-}2M^+$ (M is an element of Group 1 of the periodic table).

According to still another exemplary embodiment of the present specification, the ratio of the repeating unit of Chemical Formula A and the repeating unit of Chemical Formula B in the total copolymer may be 1:0.001 to 1:1,000.

According to yet another exemplary embodiment of the present specification, the copolymer may have a weight average molecular weight of 500 g/mol or more and 5,000,000 g/mol or less. When the weight average molecular weight of the copolymer is within the range, mechanical properties of the composite membrane including the copolymer do not deteriorate, and an appropriate solubility of the copolymer may be maintained.

According to an exemplary embodiment of the present specification, the type and particle diameter of functional additive particle are the same as those described above.

Another exemplary embodiment of the present specification provides a method for preparing a composite membrane including two or more polymer layers including an ion transfer polymer, in which the two or more of the polymer layers include functional additive particles having different contents; or at least one layer of the polymer layers includes a functional additive particle, and at least one layer of the polymer layers does not include a functional additive particle.

Still another exemplary embodiment of the present specification provides a method for preparing a composite membrane including an ion transfer polymer and a functional additive particle, in which the composite membrane has a portion where the concentration of the functional additive particle in a thickness direction of the composite membrane is different from those of the other portions.

According to another exemplary embodiment of the present specification, each of the polymer layers or the composite membrane may be prepared by an inkjet method or a roll printing method, but the preparation method is not limited thereto.

According to still another exemplary embodiment of the present specification, the polymer layers may be each prepared and then laminated, but any one polymer layer may be formed, and then a composition for forming an additional polymer layer may be coated thereon and cured or dried, if necessary, to form an additional polymer layer. As another example, compositions for forming the respective polymer layers may be sequentially coated, and then a composite membrane may also be formed by collective curing or drying. In this case, it is possible to prepare a composite membrane having a portion where the concentration of the functional additive particle in a thickness direction of the composite membrane is different from those of the other portions, by varying the contents of the functional additive particle in each composition for forming a polymer layer, which is sequentially coated.

According to yet another exemplary embodiment of the present specification, the polymer layer may be prepared by a continuous process, but the preparation method is not limited thereto.

According to still yet another exemplary embodiment of the present specification, the polymer layer may be prepared and laminated one by one in the form of a sheet, but the preparation method is not limited thereto.

An exemplary embodiment of the present specification provides an electrochemical cell including: a negative electrode; a positive electrode; and the above-described composite membrane disposed between the negative electrode and the positive electrode. The composite membrane may serve as a separation membrane.

Further, according to another exemplary embodiment of the present specification, the electrochemical cell may be a fuel cell.

According to still another exemplary embodiment of the present specification, the electrochemical cell may be a flow battery.

The fuel cell or the flow battery may use structures, materials, and methods known in the art, except that the above-described composite membrane is included as a separation membrane.

MODE FOR INVENTION

Hereinafter, the present specification will be described in more detail through Examples. However, the following Examples are provided only for exemplifying the present specification, but are not intended to limit the present specification.

Example 1

20 wt % of Nafion as an ion transfer polymer was added to 80 wt % of a solvent (the ratio of the weights of isopropyl alcohol and water as a solvent is 7:3) to form Composition A containing no functional additive particle, and the resulting composition was applied onto a base material, thereby forming a first polymer layer having a thickness of 120 μm.

A silica particle (50 nm) as the functional additive particle was added to Composition A such that the weight ratio of the ion transfer polymer and the silica particle was 4:6, and a second polymer layer having a thickness of 60 μm was formed on the first polymer layer, thereby preparing a composite membrane.

Example 2

20 wt % of Nafion as an ion transfer polymer was added to 80 wt % of a solvent (the ratio of the weights of isopropyl alcohol and water as a solvent is 7:3) to form Composition A containing no functional additive particle, and the resulting composition was applied onto a base material, thereby forming a first polymer layer having a thickness of 100 μm.

A silica particle (50 nm) as the functional additive particle was added to Composition A such that the weight ratio of the ion transfer polymer and the silica particle was 4:6, and a second polymer layer having a thickness of 60 μm was formed on the first polymer layer.

Composition A containing no functional additive particle was applied again onto the second polymer layer, thereby preparing a composite membrane in which a fourth polymer layer having a thickness of 100 μm is formed.

Example 3

Except that in Example 1, a silica particle (50 nm) as the functional additive particle was added to Composition A to form a second polymer layer on the first polymer layer such that the weight ratio of the ion transfer polymer and the silica particle was 90:10.

graphene oxide was added to Composition A containing no functional additive particle to further form a third polymer layer having a thickness of 130 μm on a surface opposite to a surface of the first polymer layer in Example 1 on which the second polymer layer was provided such that the weight ratio of the ion transfer polymer and graphene oxide particle was 98.8:1.2, a composite membrane was prepared in the same manner as in Example 1.

Comparative Example 1

A polymer layer including a single layer having a thickness of 120 μm was formed of a composition which is the same as the composition of the first polymer layer in Example 1 on a base material.

Comparative Example 2

In Example 1, a silica particle (50 nm) as the functional additive particle was added to Composition A such that the weight ratio of the ion transfer polymer and the silica particle was 95:5, and a polymer layer including a single layer having a thickness of 150 μm was formed on a substrate.

Comparative Example 3

In Example 1, a silica particle (50 nm) as the functional additive particle was added to Composition A such that the weight ratio of the ion transfer polymer and the silica particle was 90:10, and a polymer layer including a single layer having a thickness of 150 μm was formed on a substrate.

Comparative Example 4

A polymer layer including a single layer having a thickness of 100 μm to 120 μm was formed of a composition, which is the same as the composition of the second polymer layer in Example 1, on a base material.

However, in the process of forming a membrane by applying the composition onto the base material, and then drying the composition, the membrane was split, and as a result, the membrane was in a state in which the membrane could not be used as a membrane for an electrochemical cell.

Experimental Example 1

The vertical cross-sections of the membranes prepared in Examples 1 to 3 and Comparative Example 3 were captured by a scanning electron microscope, and the results are each illustrated in FIGS. 3 to 6.

Experimental Example 2

The membranes prepared in Example 1 and Comparative Examples 1 to 3 were used as a separation membrane to measure the ion conductivity and vanadium transmittance of the separation membrane.

For the ion conductivity, the on-resistance (impedance) was measured in a 0.5 M aqueous sulfuric acid solution, and the permeated hydrogen ion conductivity (through-plane conductivity) of the separation membrane was calculated through the following procedure. In this case, the permeated hydrogen ion conductivity is an intrinsic conductivity of a membrane in which the thickness of the separation membrane was corrected.

1) Separation membrane resistance ($R_{mem}$)=$R_{cell}$ (total resistance of a cell in which a membrane is placed into an aqueous sulfuric acid solution cell)−$R_{electrolyte}$ (resistance of an aqueous sulfuric acid solution)
2) Area resistance ($R_A$)=$R_{mem} \times A$ (Area of a separation membrane)
3) Resistivity ($\rho$)=$R_A/L$ (thickness of a separation membrane)
4) Permeated conductivity (Conductivity, K)=$1/\rho = L/R_A$ The vanadium transmittance was measured by using a first aqueous solution including 1 M $VOSO_4$ and 2M sulfuric acid and a second aqueous solution including 1M $MgSO_4$ and 2M sulfuric acid. The first and second aqueous solutions were blocked by the separation membrane, and the concentration of vanadium permeating the separation membrane over time and the thickness of the separation membrane were measured to obtain a diffusion coefficient D of the separation membrane according to the following Fick's $1^{st}$ laws of diffusion. In this case, a diffusion coefficient was measured as a vanadium transmittance, and the diffusion coefficient is an intrinsic value of a separation membrane in which the thickness of the separation membrane was corrected.

$$\frac{dn_B(t)}{dt} = D\frac{A}{L}(C_A - C_B(t))$$

D: diffusion coefficients of vanadium ions ($m^2\ s^{-1}$)
A: effective area of the membrane ($m^2$)
L: thickness of the membrane (m)
CA: concentration of vanadium ions in enrichment side (mol $L^{-1}$)
CB: concentration of vanadium ions in deficiency side (mol $L^{-1}$)
t: test time
The results are shown in the following Table 1.

TABLE 1

| Classification | Comparative Example 1 | Comparative Example 2 | Comparative Example 3 | Example 1 |
|---|---|---|---|---|
| Permeated ion conductivity (S/cm) | 0.032 | 0.030 | 0.029 | 0.021 |
| Vanadium transmittance (D) ($cm^2$/min) × $10^{-6}$ | 15.8 | 8.31 | 6.80 | 3.63 |

The invention claimed is:
1. A composite membrane comprising:
a first polymer layer composed of an ion transfer polymer or composed of an ion transfer polymer and a stabilizer;
a second polymer layer provided on the first polymer layer and having an ion transfer polymer and a functional additive particle; and
a fourth polymer layer provided on a surface of the second polymer layer that is opposite to the surface on which the first polymer layer is provided,
wherein the fourth polymer layer is composed of an ion transfer polymer, or is composed of an ion transfer polymer and a stabilizer, and
the functional additive particle is at least one of a silicon element-containing particle, a graphite oxide particle, a metal particle, and a metal oxide particle,
wherein a content of the functional additive particle is 60 wt % or more and 80 wt % or less based on a total weight of the second polymer layer, and
wherein the second polymer layer is positioned within a range of 10% or more and 90% or less of a thickness of the composite membrane from an upper surface or a lower surface of the composite membrane.
2. The composite membrane of claim 1, wherein the second polymer layer has a thickness of 60 μm or more and 150 μm or less.
3. The composite membrane of claim 1, wherein the first polymer layer is brought into contact with the second polymer layer.
4. The composite membrane of claim 1, further comprising:

a third polymer layer provided on a surface of the first polymer layer that is opposite to the surface on which the second polymer layer is provided, wherein the third polymer layer has an ion transfer polymer and a functional additive particle.

5. The composite membrane of claim 4, wherein the functional additive particle of the second polymer layer and the functional additive particle of the third polymer layer are different from each other.

6. The composite membrane of claim 4, wherein the second polymer layer and the third polymer layer have a portion where a concentration of the functional additive particle in each thickness direction of the composite membrane is different from those of the other portions.

7. The composite membrane of claim 4, wherein in the second polymer layer and the third polymer layer, a concentration of the functional additive particle is gradually changed in each thickness direction.

8. The composite membrane of claim 1, wherein the functional additive particle has a diameter of 1 nm or more and 100 μm or less.

9. The composite membrane of claim 1, wherein the silicon element-containing particle is a silicon particle, a silica particle, or a silica particle having a sulfonic acid group.

10. The composite membrane of claim 1, wherein the metal particle or the metal oxide particle comprises at least one of Ag, Ni, Cu, Ti, Pt, and oxides thereof.

11. The composite membrane of claim 1, wherein at least one layer of the polymer layers comprises two or more ion transfer polymers which are different from each other.

12. The composite membrane of claim 1, wherein the ion transfer polymers comprised in adjacent polymer layers are the same.

13. The composite membrane of claim 1, wherein the ion transfer polymer of the first and/or second polymer layer(s) comprises one or more selected from an ion exchange resin of a hydrocarbon; a fluorine-based ion resin; and an anionic resin.

14. An electrochemical cell comprising:
a negative electrode;
a positive electrode; and
the composite membrane according to claim 1 disposed between the negative electrode and the positive electrode.

15. The electrochemical cell of claim 14, wherein the electrochemical cell is a fuel cell or a redox flow battery.

* * * * *